United States Patent
Wang et al.

(10) Patent No.: US 10,095,592 B2
(45) Date of Patent: Oct. 9, 2018

(54) FAILOVER METHOD, APPARATUS AND SYSTEM

(71) Applicant: Huawei Technologies Co., Ltd., Shenzhen (CN)

(72) Inventors: Junjie Wang, Hangzhou (CN); Ruiling Wang, Hangzhou (CN); Yan Ye, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 154 days.

(21) Appl. No.: 15/175,818

(22) Filed: Jun. 7, 2016

(65) Prior Publication Data

US 2016/0292054 A1 Oct. 6, 2016

Related U.S. Application Data

(63) Continuation of application No. PCT/CN2014/073908, filed on Mar. 21, 2014.

(51) Int. Cl.
*G06F 11/00* (2006.01)
*G06F 11/20* (2006.01)
(Continued)

(52) U.S. Cl.
CPC ...... *G06F 11/2025* (2013.01); *G06F 11/2023* (2013.01); *G06F 11/2289* (2013.01);
(Continued)

(58) Field of Classification Search
CPC ............ G06F 11/2023; G06F 11/2025; G06F 11/203; G06F 11/2033
See application file for complete search history.

(56) References Cited

U.S. PATENT DOCUMENTS 9,684,575 B2 * 6/2017 Breakstone ......... G06F 11/2012
2009/0164694 A1 * 6/2009 Talayco .............. G06F 13/4022
710/316
(Continued)

FOREIGN PATENT DOCUMENTS

CN 101102177 A 1/2008
CN 101382907 A 3/2009
(Continued)

OTHER PUBLICATIONS

Partial English Translation and Abstract of Chinese Patent Application No. CN101382907, May 31, 2016, 5 pages.
(Continued)

*Primary Examiner* — Michael Maskulinski
(74) *Attorney, Agent, or Firm* — Conley Rose, P.C.

(57) ABSTRACT

A failover method, apparatus and system to implement fast failover between a primary processor and a secondary processor, where the method includes receiving, by a second device, a transaction processing packet, where the transaction processing packet includes processing information about access of a host to a peripheral component interconnect express (PCIe) device, the processing information is used to describe information required for resuming a transaction when the transaction is interrupted, the second device further stores topology information of the PCIe device, and a driver for the PCIe device is loaded to the second device, and when detecting that the first device fails, continuing to process, by the second device according to the topology information, the driver, and the processing information, the transaction that is about the access of the host to the PCIe device and is being processed when a first device fails.

12 Claims, 7 Drawing Sheets

(51) Int. Cl.
  *H04L 1/22* (2006.01)
  *G06F 13/38* (2006.01)
  *G06F 11/22* (2006.01)
  *G06F 11/30* (2006.01)
  *G06F 13/42* (2006.01)

(52) U.S. Cl.
  CPC ........ *G06F 11/3027* (2013.01); *G06F 13/385* (2013.01); *G06F 13/4282* (2013.01); *H04L 1/22* (2013.01)

(56) References Cited

U.S. PATENT DOCUMENTS

| | | | | |
|---|---|---|---|---|
| 2011/0320861 A1* | 12/2011 | Bayer | ................ | G06F 11/2033 714/5.11 |
| 2015/0052282 A1* | 2/2015 | Dong | ................ | G06F 13/32 710/308 |
| 2017/0147456 A1* | 5/2017 | Lee | ................ | G06F 11/2033 |

FOREIGN PATENT DOCUMENTS

| | | |
|---|---|---|
| CN | 101714109 A | 5/2010 |
| CN | 103618618 A | 3/2014 |

OTHER PUBLICATIONS

Partial English Translation and Abstract of Chinese Patent Application No. CN101714109, May 31, 2016, 6 pages.
Foreign Communication From a Counterpart Application, Chinese Application No. 201480000478.2, Chinese Office Action dated Sep. 20, 2016, 6 pages.
Foreign Communication From a Counterpart Application, PCT Application No. PCT/CN2014/073908, English Translation of International Search Report dated Nov. 28, 2014, 2 pages.
Foreign Communication From a Counterpart Application, PCT Application No. PCT/CN2014/073908, English Translation of Written Opinion dated Nov. 28, 2014, 6 pages.

* cited by examiner

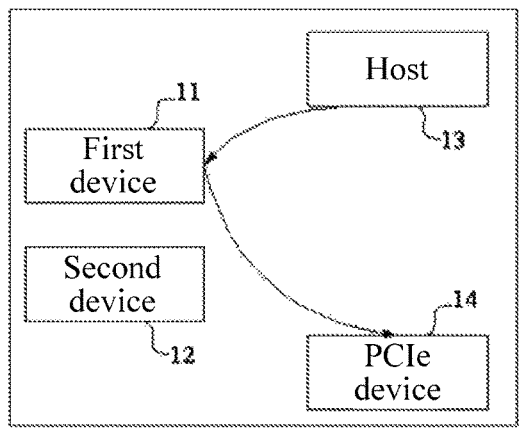

FIG. 1

```
A second device receives a transaction processing packet used to
notify a transaction that is about access of a host to a PCIe device and     201
is processed by a first device, where the transaction processing packet
  carries processing information, and the processing information is
used to describe information required for resuming the transaction
               when the transaction is interrupted
```

The second device detects that the first device fails — 202

The second device continues to process, according to topology information, a driver, and the processing information, the transaction that is about the access of the host to the PCIe device and is being processed when the first device fails — 203

FIG. 2

FAILOVER METHOD, APPARATUS AND SYSTEM

CROSS-REFERENCE TO RELATED APPLICATIONS

This application is a continuation of International Application No. PCT/CN2014/073908, filed on Mar. 21, 2014, which is hereby incorporated by reference in its entirety.

TECHNICAL FIELD

The present disclosure relates to communications technologies, and in particular, to a failover method, apparatus and system.

BACKGROUND

With rapid development of hardware in recent years, existing services can no longer make full use of resources. Consequently, resource utilization is low, and return on investment of an enterprise cannot be maximized. In order to improve the resource utilization, at present, a shared input/output (shared IO) technology is put forward in the industry. That is, a single-root input/output virtualization (SR-IOV) device can be shared among different peripheral component interconnect express (PCIe) domains (that is, among different physical machines), and a physical sub-device (such as physical function (PF)) or virtual sub-device (such as virtual function (VF)) of the SR-IOV device may be bound to different hosts, and is used in a same way as a normal PCIe device. In a shared IO architecture, a global PCIe domain needs to be maintained by management central processing units (mCPU) in order to improve system reliability, a primary mCPU and a secondary mCPU are usually set among mCPUs for active/standby redundancy. When the primary mCPU breaks down, failover is performed between the primary mCPU and the secondary mCPU, that is, the secondary mCPU serves as a primary mCPU to continue to process a host service.

However, when the secondary mCPU performs failover processing, the secondary mCPU usually needs to enumerate each PCIe device again, which results in an interruption of a host service during the failover. Moreover, a more serious problem may arise: the primary mCPU is responsible for accessing a PCIe device according to a request for accessing the PCIe device sent by a host and returning an access response to the host. If the primary mCPU breaks down and failover to the secondary mCPU cannot be performed quickly in time, the access request of the host cannot be processed in time, which may lead to a breakdown of the host because of an access timeout, and may also lead to breakdowns of all hosts in an entire PCIe network for the same reason, thereby reducing reliability of the PCIe network.

SUMMARY

Embodiments of the present disclosure provide a failover method, apparatus and system in order to implement fast failover between a primary processor and a secondary processor.

According to a first aspect, a failover method is provided, including receiving, by a second device, a transaction processing packet used to notify the second device of a transaction that is about access of a host to a PCIe device and is processed by a first device, where the transaction processing packet carries processing information. The processing information is used to describe information required for resuming the transaction when the transaction is interrupted, the second device further stores topology information of the PCIe device, and a driver for the PCIe device is loaded to the second device, and when detecting that the first device fails, continuing to process, by the second device according to the topology information, the driver and the processing information, the transaction that is about the access of the host to the PCIe device and is being processed when the first device fails.

With reference to the first aspect, in a first possible implementation manner, receiving, by a second device, a transaction processing packet used to notify the second device of a transaction that is about access of a host to a PCIe device and is processed by a first device, where the transaction processing packet carries processing information includes receiving, by the second device, transaction content of the access of the host to the PCIe device, and transaction status data that is synchronized by the first device and is about the access of the host to the PCIe device, where the processing information includes the transaction content and the transaction status data.

With reference to the first possible implementation manner of the first aspect, in a second possible implementation manner, the transaction status data includes a transaction processing location identifier, and continuing to process the transaction that is about the access of the host to the PCIe device and is being processed when the first device fails includes determining, by the second device according to the transaction processing location identifier, a location in which the transaction is interrupted, and continuing to process, by the second device, the interrupted transaction from the location in which the transaction is interrupted, or processing the interrupted transaction again from a start position of the transaction.

With reference to the first possible implementation manner of the first aspect, in a third possible implementation manner, the transaction status data includes a transaction completion identifier, and after the second device receives the transaction processing packet, the method further includes deleting, by the second device, processing information corresponding to the transaction completion identifier.

With reference to any one of the first aspect to the third possible implementation manner of the first aspect, in a fourth possible implementation manner, continuing to process the transaction that is about the access of the host to the PCIe device and is being processed when the first device fails includes finding, by the second device according to the topology information, the PCIe device accessed by the host, accessing the PCIe device using the driver, and executing the transaction that is obtained according to the processing information and is being processed when the first device fails.

According to a second aspect, a failover apparatus is provided, including a receiving unit configured to receive a transaction processing packet used to notify the apparatus of a transaction that is about access of a host to a PCIe device and is processed by a first device, where the transaction processing packet carries processing information, and the processing information is used to describe information required for resuming the transaction when the transaction is interrupted, a storage unit configured to store topology information of the PCIe device and a loaded driver for the PCIe device, and a processing unit configured to, when it is detected that the first device fails, continue to process, according to the processing information received by the receiving unit and the topology information and the driver that are stored in the storage unit, the transaction that is about the access of the host to the PCIe device and is being processed when the first device fails.

With reference to the second aspect, in a first possible implementation manner, the receiving unit is further configured to receive transaction content of the access of the host to the PCIe device, and transaction status data that is synchronized by the first device and is about the access of the host to the PCIe device, where the processing information includes the transaction content and the transaction status data.

With reference to the first possible implementation manner of the second aspect, in a second possible implementation manner, the processing unit is further configured to determine, according to a transaction processing location identifier included in the transaction status data, a location in which the transaction is interrupted, and continue to process the interrupted transaction from the location in which the transaction is interrupted, or process the interrupted transaction again from a start position of the transaction.

With reference to the first possible implementation manner of the second aspect, in a third possible implementation manner, the processing unit is further configured to delete, according to a transaction completion identifier included in the transaction status data, processing information corresponding to the transaction completion identifier after the receiving unit receives the transaction processing packet.

With reference to any one of the second aspect to the third possible implementation manner of the second aspect, in a fourth possible implementation manner, the processing unit is further configured to find, according to the topology information, the PCIe device accessed by the host, access the PCIe device using the driver, and execute the transaction that is obtained according to the processing information and is being processed when the first device fails.

According to a third aspect, a failover system is provided, including a first device and a second device, where the second device is configured to receive a transaction processing packet used to notify the second device of a transaction that is about access of a host to a PCIe device and is processed by the first device, where the transaction processing packet carries processing information, the processing information is used to describe information required for resuming the transaction when the transaction is interrupted, the second device further stores topology information of the PCIe device, and a driver for the PCIe device is loaded to the second device, and when it is detected that the first device fails, continue to process, according to the topology information, the driver, and the processing information, the transaction that is about the access of the host to the PCIe device and is being processed when the first device fails.

According to a fourth aspect, a failover apparatus is provided, including a transceiver, a memory, and a processor, where the transceiver is configured to receive a transaction processing packet used to notify the apparatus of a transaction that is about access of a host to a PCIe device and is processed by a first device, where the transaction processing packet carries processing information, and the processing information is used to describe information required for resuming the transaction when the transaction is interrupted. The memory is configured to store topology information of the PCIe device and a loaded driver for the PCIe device, and the processor is configured to, when it is detected that the first device fails, continue to process, according to the processing information received by the transceiver and the topology information and the driver that are stored in the memory, the transaction that is about the access of the host to the PCIe device and is being processed when the first device fails.

With reference to the fourth aspect, in a first possible implementation manner, the transceiver is further configured to receive transaction content of the access of the host to the PCIe device, and transaction status data that is synchronized by the first device and is about the access of the host to the PCIe device, where the processing information includes the transaction content and the transaction status data.

With reference to the first possible implementation manner of the fourth aspect, in a second possible implementation manner, the processor is further configured to determine, according to a transaction processing location identifier included in the transaction status data, a location in which the transaction is interrupted, and continue to process the interrupted transaction from the location in which the transaction is interrupted, or process the interrupted transaction again from a start position of the transaction.

With reference to the first possible implementation manner of the fourth aspect, in a third possible implementation manner, the processor is further configured to delete, according to a transaction completion identifier included in the transaction status data, processing information corresponding to the transaction completion identifier after the transceiver receives the transaction processing packet.

With reference to any one of the fourth aspect to the third possible implementation manner of the fourth aspect, in a fourth possible implementation manner, the processor is further configured to find, according to the topology information, the PCIe device accessed by the host, access the PCIe device using the driver, and execute the transaction that is obtained according to the processing information and is being processed when the first device fails.

In the embodiments of the present disclosure, a second device (that may be a secondary processor) stores, in advance, device information of a PCIe device to be accessed by a host, and does not need to enumerate PCIe devices again during failover performed by the second device, thereby saving failover time. Moreover, the second device further receives processing information of a transaction that is processed by the first device (that may be a primary processor) and is about access of the host to the PCIe device, and can continue to process the transaction according to the processing information, thereby implementing fast failover between the primary processor and the secondary processor.

BRIEF DESCRIPTION OF DRAWINGS

FIG. 1 is an architectural diagram of a system applied in a failover method according to an embodiment of the present disclosure;

FIG. 2 is a schematic flowchart of a failover method according to an embodiment of the present disclosure;

DESCRIPTION OF EMBODIMENTS

Figure 3:
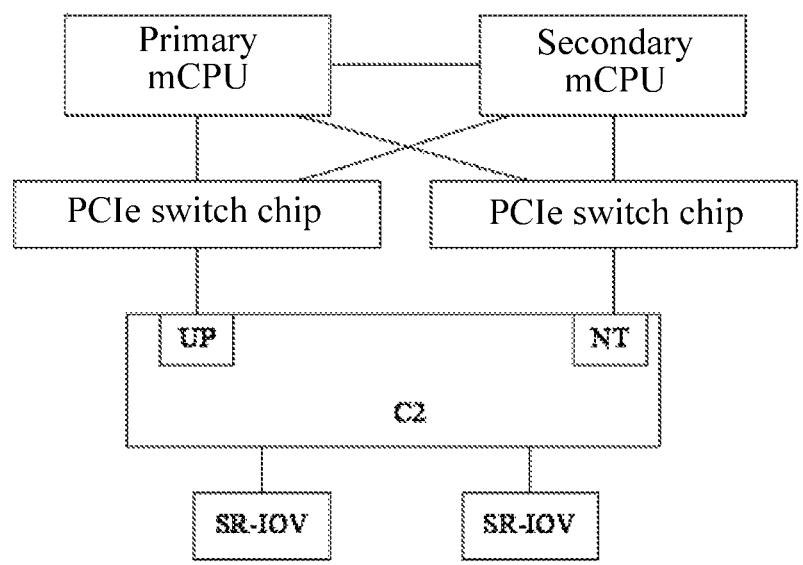
FIG. 3 is a diagram of a physical architecture applied in another failover method according to an embodiment of the present disclosure.

Embodiments of the present disclosure provide a failover method. The method, for example, may be applied to failover between a primary mCPU and a secondary mCPU in a shared IO architecture, but is not limited to the shared IO architecture, and any PCIe network interconnection system having an mCPU can use the technical solution of the present disclosure.

Embodiment 1

FIG. 1 is an architectural diagram of a system applied in a failover method according to an embodiment of the present disclosure. As shown in FIG. 1, the system includes a first device 11, a second device 12, a host 13, and a PCIe device 14.

The first device 11, for example, is a primary mCPU, and is responsible for processing a request for access of the host 13 to the PCIe device 14. The second device 12, for example, is a secondary mCPU, and when the first device 11 fails, that is, breaks down, the second device 12 may replace the first device 11 to process the request for the access of the host 13 to the PCIe device 14. In this case, failover is performed by the second device 12, and after the failover, the second device 12 changes from being the secondary mCPU originally to being a primary mCPU currently. It should be noted that the first device and the second device in this embodiment of the present disclosure are merely described using mCPUs as an example, but are not limited thereto in specific implementation, and may be other chips having processing and management functions, for example, common CPUs or microprocessors such as advanced reduced instruction set computing machines (ARM).

A flowchart in FIG. 2 describes a method of a failover process performed by the second device 12. FIG. 2 is a schematic flowchart of a failover method according to an embodiment of the present disclosure, including the following steps.

Step 201: A second device receives a transaction processing packet used to notify the second device of a transaction that is about access of a host to a PCIe device and is processed by a first device, where the transaction processing packet carries processing information, and the processing information is used to describe information required for resuming the transaction when the transaction is interrupted.

The transaction may be a processing process. For example, when the host 13 needs to process data in the PCIe device, assuming that three steps A-B-C need to be executed in sequence to complete the processing process, the processing process may be referred to as a transaction. The transactional concept can be applied to any driver.

The transaction processing packet received by the second device aims to notify the second device of information related to the transaction that is about the access of the host to the PCIe device and is processed by the first device. The transaction processing packet includes the processing information, and according to the processing information, the second device may resume the transaction during the failover, where the processing information may further include transaction content of the access of the host to the PCIe device, and transaction status data that is synchronized by the first device and is about the access of the host to the PCIe device.

An example is described as follows: assuming that three steps A-B-C need to be executed in sequence to complete processing on data in the PCIe device by the host 13, in this case, data that is further processed in each step (such as A, B, or C) and a data processing result in each step may be referred to as the transaction content, which may be multicast to the second device when being sent to the first device by the host or the PCIe device such that the second device can learn of processing content of the transaction in real time. The first device may synchronize, to the second device, the transaction status data used to indicate transaction processing progress. For example, after completing processing in step A, the first device may notify the second device, the transaction status data may be $A_{over}$ for example, and the second device may learn, according to the transaction status data, that step A of the transaction is completed. Using the foregoing transaction content and transaction status data, the second device can learn of the transaction processing progress of the first device in real time, which provides a basis for subsequent fast failover.

For a more specific example, assuming that the transaction to be processed is that the host needs to write some data into a PCIe device, in this case, the host sends a write request message to the primary mCPU, where the write request message may include a write command, data to be written, a PCIe device into which the data is to be written, and the like, after receiving the message, the primary mCPU parses the message, and according to the foregoing content included in the message, writes the data into the corresponding PCIe device step by step. After receiving a write success response returned by the PCIe device, the primary mCPU learns that processing of the transaction is completed. In this transaction, when sending the write request message to the primary mCPU, the host multicasts the write request message to the secondary mCPU, that is, the write command, the data to be written, the PCIe device into which the data is to be written, and the like are synchronized to the secondary mCPU. The write command, the data to be written, the PCIe device into which the data is to be written, and the like are referred to as the transaction content, and the secondary mCPU may learn what the transaction is further about. After receiving the write success response returned by the PCIe device, the primary mCPU also notifies, for synchronization, the secondary mCPU of completion of the transaction. For example, the notification may be performed by sending, to the secondary mCPU, a message including a transaction identifier and a completion identifier, where the transaction identifier and the completion identifier may be referred to as the transaction status data, and the secondary mCPU may learn of the processing progress of the transaction accordingly, such as completion of the transaction.

Step 202: The second device detects that the first device fails.

In specific implementation, a heartbeat connection is established between the first device and the second device. When detecting that the heartbeat connection to the first device is interrupted, the second device accordingly determines that the first device fails, that is, breaks down.

Step 203: The second device continues to process, according to topology information, a driver, and the processing information, the transaction that is about the access of the host to the PCIe device and is being processed when the first device fails.

In this embodiment, the second device stores, in advance, device information of the PCIe device, and the device information includes topology information of the PCIe device and a driver for the PCIe device. The topology information of the PCIe device may be sent to the second device when initialization of the first device is completed, and the second device loads the driver for the PCIe device according to the topology information. However, in this case, the driver does not execute a hardware operation, but only initializes a data structure of an operating system (OS). Processing, namely, obtaining the topology information of the PCIe device and loading the device driver in advance, can save time during failover to the second device, which significantly increases a failover speed of the second device compared with the prior art in which the second device needs to enumerate PCIe devices again during failover.

When the first device fails, the second device resumes, according to the topology information stored in advance in the second device, the driver for the PCIe device loaded in advance, and the received processing information that are described in step 203, the transaction processed by the first device. For example, the second device may find, according to the topology information, the PCIe device accessed by the host, access the PCIe device using the driver (the device can be accessed only when the driver corresponding to the device is loaded), and execute the transaction that is obtained according to the processing information and is being processed when the first device fails. For example, if it is learned, according the processing information, that processing of a transaction has been completed when the first device fails, the second device does not process the transaction any more. If it is learned, according the processing information, that processing of a transaction has proceeded to an intermediate step when the first device fails, the second device may continue to process the transaction from this step.

The continuing to process the transaction that is about the access of the host to the PCIe device and is being processed when the first device fails may further include the following various processing manners.

For example, the transaction status data received in step 201 may include a transaction processing location identifier, for example, the identifier indicating that processing of the transaction has proceeded to step B, after receiving the identifier used to indicate that processing of the transaction has proceeded to step B, if the second device detects that the first device fails, the second device may determine, according to the transaction processing location identifier, that the location in which the transaction is interrupted is after step B, that is, processing in step C has not been completed. The second device may continue to process the interrupted transaction from the location in which the transaction is interrupted, for example, continue to execute step C, or process the transaction again from a start position of the transaction, for example, go back to step A to start executing the process again.

For another example, the transaction status data received in step 201 may include a transaction completion identifier. For example, after completing execution of the three steps A-B-C, the first device may notify the second device of completion of the transaction. Assuming that "T0" is used as the transaction completion identifier to indicate that a transaction T has been completed, where the transaction T is a processing process including the three steps A-B-C, in this case, the second device may delete, according to the T0, processing information corresponding to the transaction T, including transaction content, transaction status data, and the like.

In this embodiment of the present disclosure, a second device stores, in advance, device information of a PCIe device to be accessed by a host, and does not need to enumerate PCIe devices again during failover performed by the second device, thereby saving failover time. Moreover, the second device further receives processing information of a transaction that is processed by a first device and is about access of the host to the PCIe device, and can continue to process the transaction according to the processing information, thereby implementing fast failover.

Embodiment 2

FIG. 3 is a diagram of a physical architecture applied in another failover method according to an embodiment of the present disclosure. As shown in FIG. 3, C2 represents a chip that supports shared IO, and the chip has an upstream port (UP) and a non-transparent port (NT). A primary mCPU is connected to the UP, and a secondary mCPU is connected to the NT, a PCIe switch may be a field programmable gate array (FPGA) that supports multicast. A system shown in FIG. 3 is a shared IO architecture.

Figure 4:
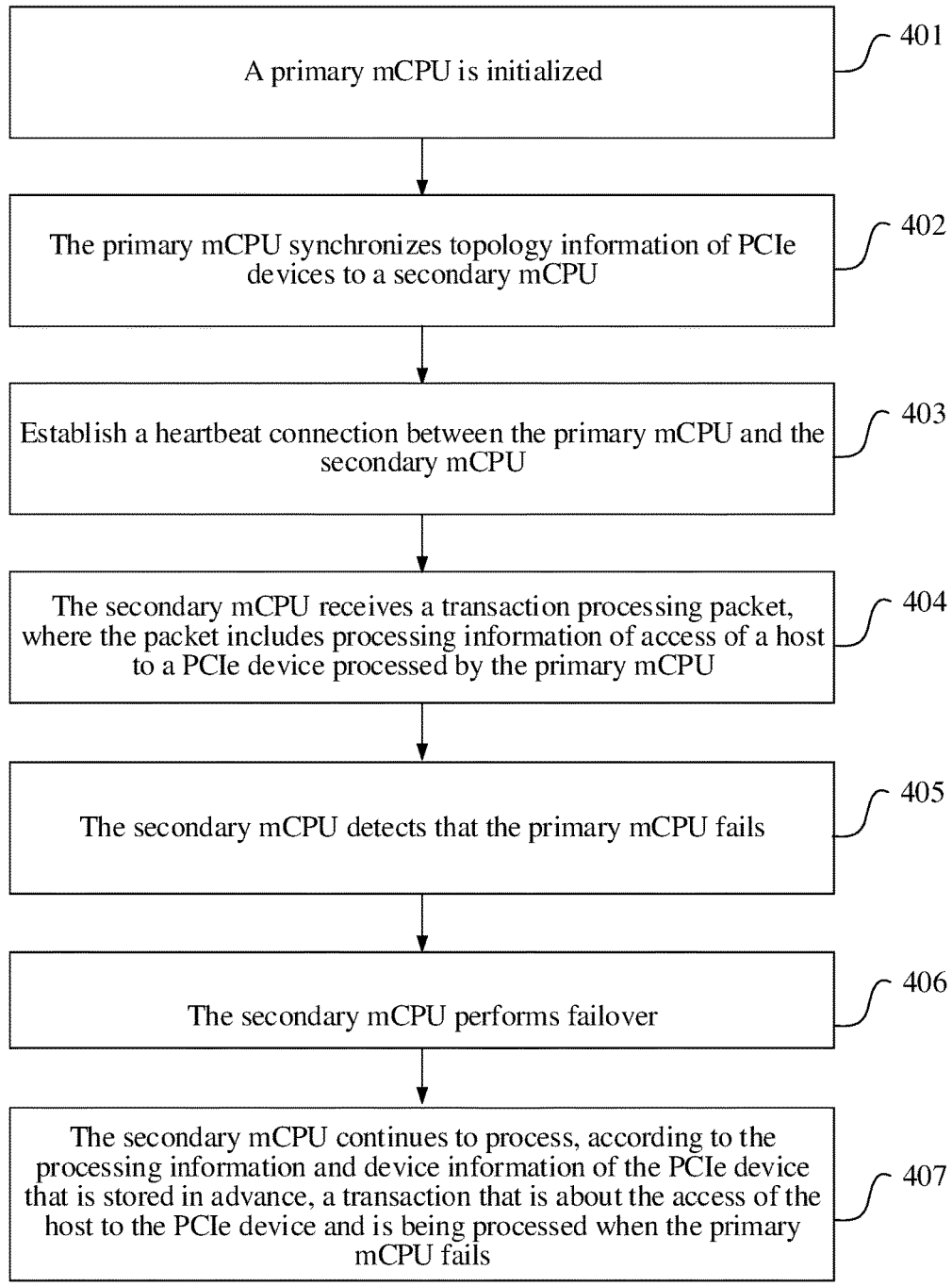
FIG. 4 is a schematic flowchart of another failover method according to an embodiment of the present disclosure.

On the basis of the architecture shown in FIG. 3, an optional failover process is provided. In the process, a first device is the primary mCPU, and a second device is the secondary mCPU. FIG. 4 is a schematic flowchart of another failover method according to an embodiment of the present disclosure. As shown in FIG. 4, the method includes the following steps.

Step 401: The primary mCPU is initialized.

The primary mCPU scans a PCI tree, where the PCI tree includes multiple PCIe devices that are in an interconnection relationship, and topology information of the PCIe devices is obtained by means of scanning. One or more drivers for the PCIe devices are further loaded to the primary mCPU, with each driver including a PF driver and a shared IO management driver. A communication channel between the primary mCPU and the secondary mCPU is initialized, and the primary mCPU declares that the primary mCPU is a primary node.

Step 402: The primary mCPU synchronizes topology information of PCIe devices to the secondary mCPU.

The primary mCPU may synchronize the topology information of the PCIe devices to the secondary mCPU when scanning of the PCI tree is completed. The secondary mCPU loads the one or more drivers for the PCIe devices that are in the corresponding PCI tree, by this time, however, the driver for the PCIe device has not operated real hardware, but merely initializes a data structure of an OS and is isolated from a hardware operation, such as an operation of writing, into hardware registers, a bar space address assigned to a virtual sub-device.

In this way, the secondary mCPU stores, in advance, device information of the PCIe devices, including the topology information of the PCIe devices and the one or more loaded drivers for the PCIe devices. Because the primary mCPU synchronizes the topology information to the secondary mCPU when the initialization is completed, the secondary mCPU does not need to enumerate the PCI tree again when the primary mCPU breaks down, which significantly saves failover time.

Step 403: Establish a heartbeat connection between the primary mCPU and the secondary mCPU.

Step 404: The secondary mCPU receives a transaction processing packet, where the packet includes processing information of a transaction that is processed by the primary mCPU and is about access of the host to the PCIe device.

In this embodiment, the transaction processing packet received by the secondary mCPU includes transaction content of the access of the host to the PCIe device, for example, both a response to the access of the primary mCPU to the PCIe device and the transaction processing packet that is sent by the PCIe device to the primary mCPU are multicast to the secondary mCPU. The transaction processing packet received by the secondary mCPU further includes transaction status data that is synchronized by the primary mCPU and is about the access of the host to the PCIe device. For example, after completing processing of a transaction, the primary mCPU notifies the secondary mCPU, and the transaction status data may include a transaction completion identifier used to notify the secondary mCPU of completion of the processing of the transaction. Alternatively, the transaction status data may further include a transaction processing location identifier that is used to, for example, indicate that processing of the transaction has proceeded to step C when the primary mCPU breaks down.

Step 405: The secondary mCPU detects that the primary mCPU fails.

In a specific implementation, as shown in FIG. 3, the heartbeat connection is established between the primary mCPU and the secondary mCPU. When detecting that the heartbeat connection to the primary mCPU is interrupted, the secondary mCPU determines that the primary mCPU breaks down.

Step 406: The secondary mCPU performs failover.

The secondary mCPU may configure the PCIe switch to interchange the NT with the UP. In this way, it is equivalent that the secondary mCPU is connected to the UP of the PCIe switch and is visible to PCIe devices mounted to the PCIe switch, and the secondary mCPU may declare that the secondary mCPU is a primary mCPU.

Step 407: The secondary mCPU continues to process, according to the processing information and device information of the PCIe device that is stored in advance, a transaction that is about the access of the host to the PCIe device and is being processed when the primary mCPU fails.

In this embodiment, before the primary mCPU breaks down, the secondary mCPU only records processing information, and after the primary mCPU breaks down, the secondary mCPU continues to process the transaction according to the processing information in step 404 and the device information of the PCIe device that is stored in advance in step 402.

For example, the secondary mCPU determines, according to the transaction processing location identifier in the processing information, a location in which the transaction is interrupted when the primary mCPU breaks down. For example, if the primary mCPU breaks down during step C, the secondary mCPU may continue to process the interrupted transaction from the location in which the transaction is interrupted, that is, continue to execute the transaction from step C, or the secondary mCPU processes the transaction again from a start position of the transaction, that is, executes the A-B-C process from step A.

For another example, the secondary mCPU may also delete, according to the transaction completion identifier in the processing information, processing information corresponding to the transaction completion identifier. For example, after completing execution of the three steps A-B-C, the first device may notify the second device of completion of the transaction. Assuming that T0 is used as the transaction completion identifier to indicate that a transaction T has been completed, where the transaction T is a processing process including the three steps A-B-C, in this case, the second device may delete, according to the T0, processing information corresponding to the transaction T, including transaction content, transaction status data, and the like.

In addition, operating a register by a driver may have a side effect, such as read-clear, write only, and an interruption triggered upon writing. Therefore, these special cases need to be considered in transaction processing, and special identification needs to be performed.

In this embodiment of the present disclosure, a secondary mCPU stores, in advance, device information of a PCIe device to be accessed by a host, and does not need to enumerate PCIe devices again during failover, thereby saving failover time. Moreover, the secondary mCPU further receives processing information of a transaction that is processed by a primary mCPU and is about access of the host to the PCIe device, and can continue to process the transaction according to the processing information, thereby implementing fast failover.

Embodiment 3

Figure 5:
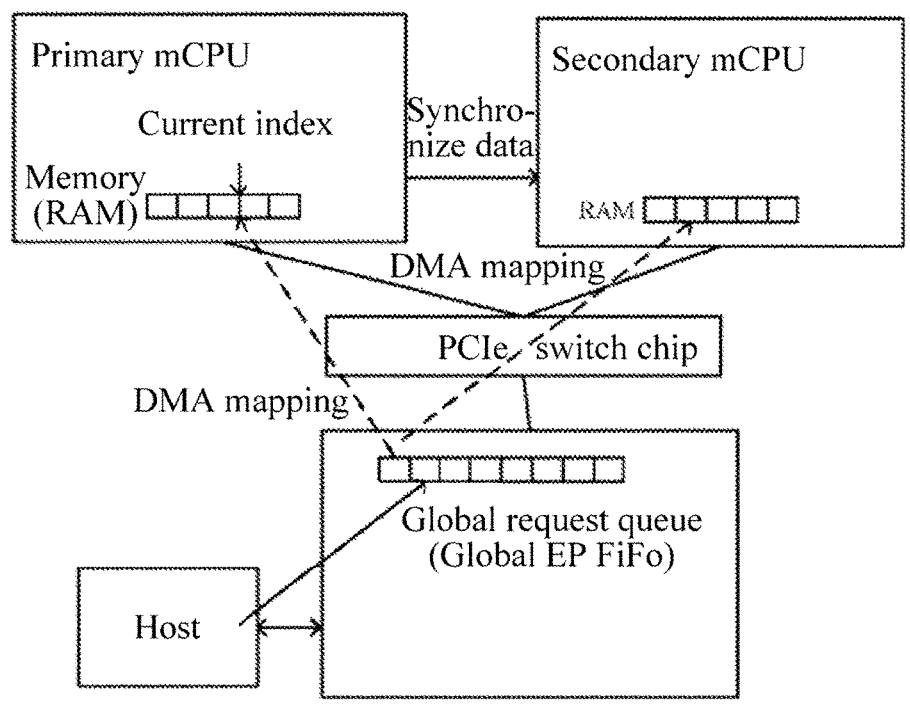
FIG. 5 is a diagram of a system architecture applied in still another failover method according to an embodiment of the present disclosure.

FIG. 5 is a diagram of a system architecture applied in still another failover method according to an embodiment of the present disclosure. As shown in FIG. 5, "Primary mCPU" is a primary mCPU, "Secondary mCPU" is a backup mCPU, RAM is a random access memory, "Global EP FIFO" is a global control and status register (CSR) request queue, "Host" is a host, "DMA mapping" is direct memory access mapping, "FIFO" is a first in first out queue, and "current index" is a current index.

Figure 6:
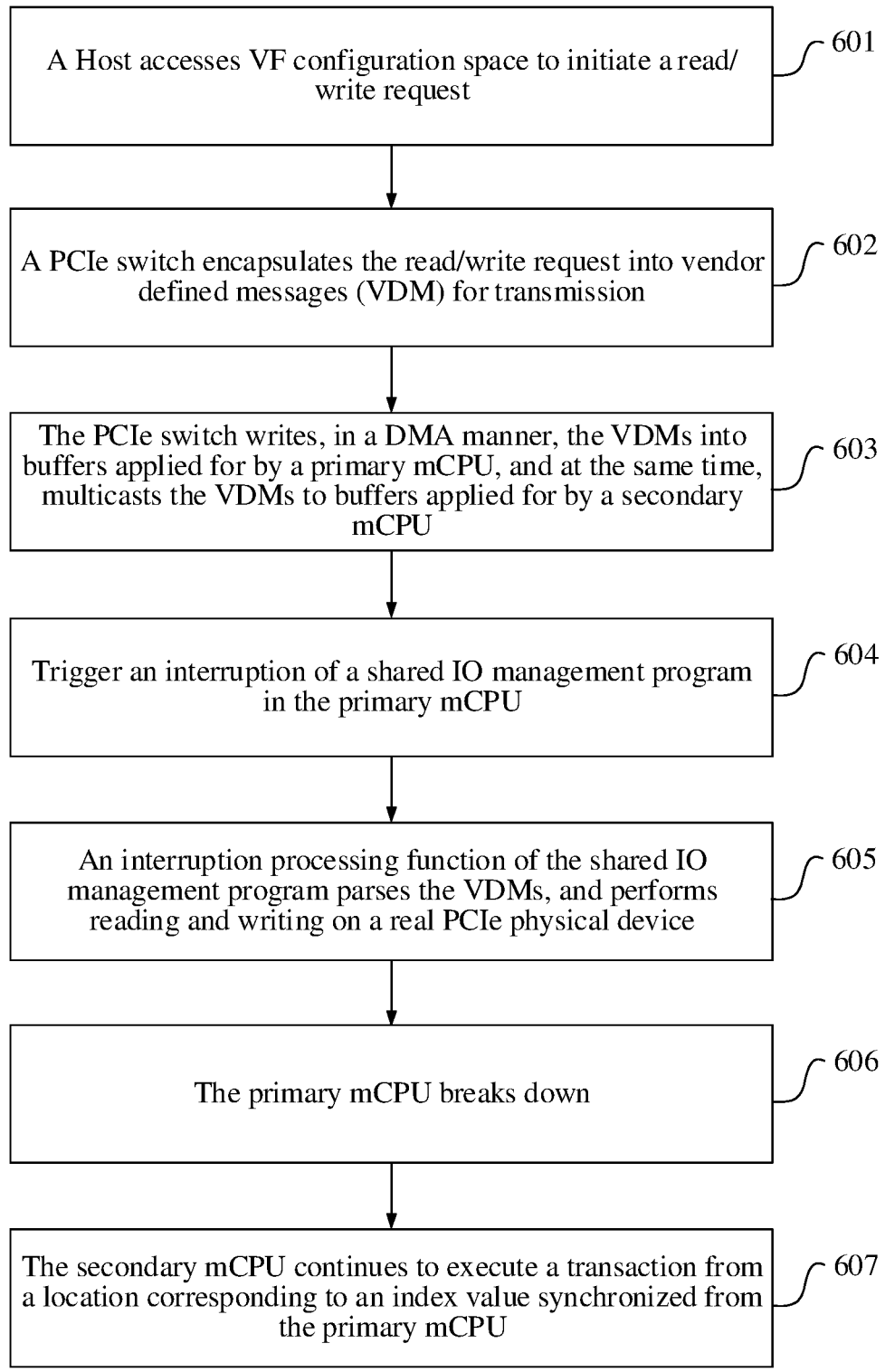
FIG. 6 is a schematic flowchart of still another failover method according to an embodiment of the present disclosure.

On the basis of the architecture shown in FIG. 5, an optional failover process is provided. In the process, a first device is the primary mCPU, and a second device is the secondary mCPU. FIG. 6 is a schematic flowchart of still another failover method according to an embodiment of the present disclosure, which describes a processing method of forwarding, by a CSR, a transaction processing packet in a shared IO management driver. As shown in FIG. 6, the method includes the following steps.

Step 601: A host accesses VF configuration space to initiate a read/write request.

Step 602: A PCIe switch encapsulates the read/write request into vendor defined messages (VDM) for transmission.

Step 603: The PCIe switch writes, in a DMA manner, the VDMs into buffers applied for by the primary mCPU, and at the same time, multicasts the VDMs to buffers applied for by the secondary mCPU.

Step 604: Trigger an interruption of a shared IO management program in the primary mCPU.

Step 605: An interruption processing function of the shared IO management program parses the VDMs, and performs reading and writing on a real PCIe physical device.

Each time the primary mCPU completes processing of a read/write request transmitted in the form of a VDM, the primary mCPU updates an index in the FIFO in a memory of the primary mCPU, and synchronizes the index to the secondary mCPU using a communication channel to the secondary mCPU.

Step 606: The primary mCPU breaks down.

Step 607: The secondary mCPU continues to execute a transaction from a location corresponding to an index value synchronized from the primary mCPU.

If the primary mCPU breaks down during processing of a VDM, the secondary mCPU may continue the execution, according to a special checkpoint and necessary data that are synchronized by the primary mCPU, from the checkpoint in order to ensure that a service of the host is not interrupted.

In this embodiment, a secondary mCPU stores, in advance, device information of a PCIe device to be accessed by a host, and does not need to enumerate PCIe devices again during failover, thereby saving failover time. Meanwhile, a packet sent to a primary mCPU is multicast to the secondary mCPU to ensure that processing is not missed out. Moreover, the secondary mCPU further receives processing information of a transaction that is processed by the primary mCPU and is about access of the host to the PCIe device, enables PCIe drive states on the primary mCPU and secondary mCPU to remain the same using a transaction manner, and can continue to process the transaction according to the processing information, thereby implementing fast failover, preventing a PCIe fabric error caused by a breakdown of the mCPU from becoming more serious, and ensuring PCIe fabric reliability.

An actual application scenario to which the failover method of this embodiment of the present disclosure is applied may be that, for example, when the host accesses the VF configuration space and the primary mCPU breaks down, failover may be performed between the primary mCPU and the secondary mCPU, or when a VF of the host communicates with a PF of the mCPU and the primary mCPU breaks down, failover is performed between the primary mCPU and the secondary mCPU, or a VF of the host performs normal data transmission and the primary mCPU breaks down, failover is performed between the primary mCPU and the secondary mCPU.

In addition, in order to ensure security of devices, some registers are not exposed to VFs and need to be operated using a PF. In this case, communication, that is, a mailbox, is required between each VF and the PF. Furthermore, scenarios of communication between the PF and the VFs include the following scenarios.

Resetting the VF.
Configuring a VF media access control address.
Setting a multicast address.
Setting a virtual local area network filter.
Setting a long packet maximum length.

Figure 7:
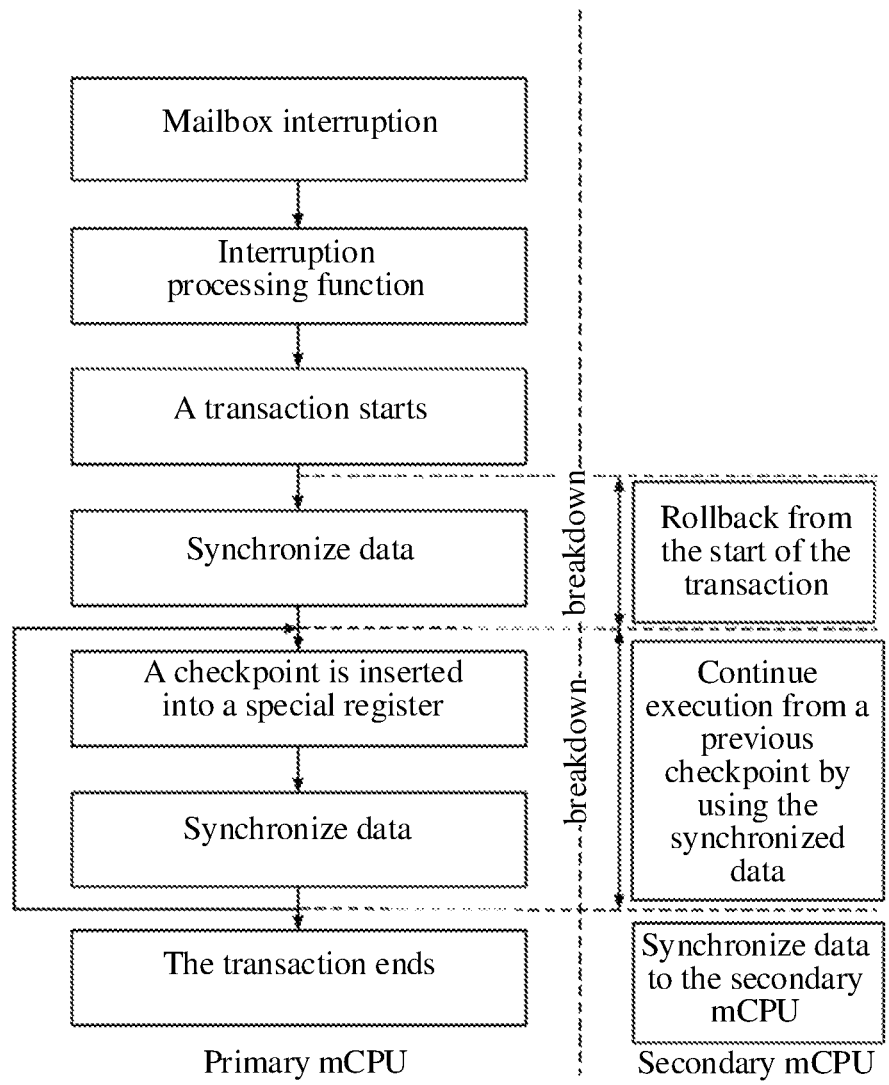
FIG. 7 is a schematic flowchart of still another failover method according to an embodiment of the present disclosure.

These operations need to be considered when the mCPU performs failover such that correctness of a service can be ensured. Processing may be performed according to a process shown in FIG. 7. FIG. 7 is a schematic flowchart of still another failover method according to an embodiment of the present disclosure.

During the foregoing communication between the PF and the VFs, each VF has an independent mailbox that can perform communication with the PF. The PF can access the mailboxes of all the VFs. A mailbox interruption processing program transverses the mailbox of each VF, processing of each VF mailbox may be treated as a complete transaction, and each transaction has multiple checkpoints. A VF mailbox that has not been processed when the primary mCPU breaks down is executed according to a normal process, and a critical VF mailbox is resumed.

Embodiment 4

Figure 8:
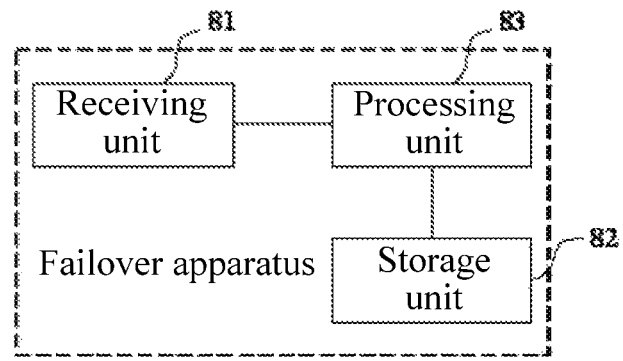
FIG. 8 is a schematic structural diagram of a failover apparatus according to an embodiment of the present disclosure.

FIG. 8 is a schematic structural diagram of a failover apparatus according to an embodiment of the present disclosure. The apparatus, for example, is a secondary mCPU, and may execute the failover method in the embodiments of the present disclosure. This embodiment only provides simple description of a structure of the apparatus, and for a specific operating principle of the apparatus, reference may be made to the method embodiments. As shown in FIG. 8, the failover apparatus may include a receiving unit 81, a storage unit 82, and a processing unit 83.

The receiving unit 81 is configured to receive a transaction processing packet used to notify the apparatus of a transaction that is about access of a host to a PCIe device and is processed by a first device, where the transaction processing packet carries processing information, and the processing information is used to describe information required for resuming the transaction when the transaction is interrupted.

The storage unit 82 is configured to store topology information of the PCIe device and a loaded driver for the PCIe device.

The processing unit 83 is configured to, when it is detected that the first device fails, continue to process, according to the processing information received by the receiving unit 81 and the topology information and the driver that are stored in the storage unit 82, the transaction that is about the access of the host to the PCIe device and is being processed when the first device fails.

The receiving unit 81 is further configured to receive transaction content of the access of the host to the PCIe device, and transaction status data that is synchronized by the first device and is about the access of the host to the PCIe device, where the processing information includes the transaction content and the transaction status data.

The processing unit 83 is further configured to determine, according to a transaction processing location identifier included in the transaction status data, a location in which the transaction is interrupted, and continue to process the interrupted transaction from the location in which the transaction is interrupted, or process the interrupted transaction again from a start position of the transaction.

The processing unit 83 is further configured to delete, according to a transaction completion identifier included in the transaction status data, processing information corresponding to the transaction completion identifier after the receiving unit 81 receives the transaction processing packet.

The processing unit 83 is further configured to find, according to the topology information, the PCIe device accessed by the host, access the PCIe device using the driver, and execute the transaction that is obtained according to the processing information and is being processed when the first device fails.

Figure 9:
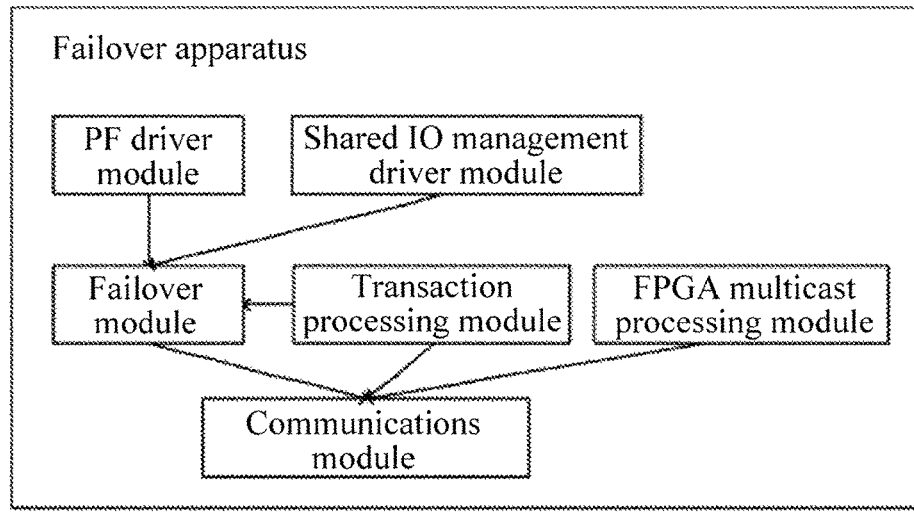
FIG. 9 is a schematic structural diagram of another failover apparatus according to an embodiment of the present disclosure.

FIG. 9 is a schematic structural diagram of another failover apparatus according to an embodiment of the present disclosure. FIG. 9 is an instance of a detailed structure of an optional failover apparatus. As shown in FIG. 9, a communications module in the apparatus may be equivalent to the foregoing receiving unit and is responsible for communication between the primary mCPU and the secondary mCPU and communication over a heartbeat channel, where all data transmission is synchronous transmission. Both a failover module and a transaction processing module in the apparatus belong to the foregoing processing unit. The failover module is responsible for processing an overall process of failover, for example, operations on a PCIe fabric such as an interchange between an NT and an UP. The transaction processing module performs determination on a transaction according to synchronized data. For example, the secondary mCPU may determine, according to transaction status data synchronized by the primary mCPU, whether the transaction is completed. If the transaction is a complete transaction, that is, the transaction is completed, the transaction processing module may delete information related to the transaction. When the primary mCPU breaks down, the transaction processing module may also determine, according to the transaction status data synchronized by the primary mCPU, a specific location in which an upper-layer driver performs execution, that is, a location in which the transaction is interrupted.

Embodiment 5

Figure 10:
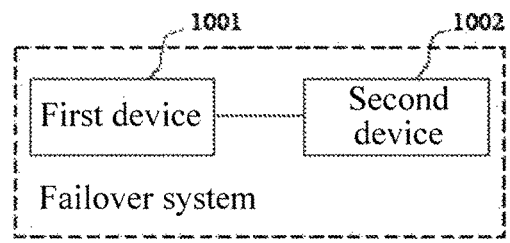
FIG. 10 is a schematic structural diagram of a failover system according to an embodiment of the present disclosure.

FIG. 10 is a schematic structural diagram of a failover system according to an embodiment of the present disclosure. As shown in FIG. 10, the system may include a first device 1001 and a second device 1002. The second device 1002 is configured to receive a transaction processing packet used to notify the second device 1002 of a transaction that is about access of a host to a PCIe device and is processed by the first device 1001, where the transaction processing packet carries processing information, the processing information is used to describe information required for resuming the transaction when the transaction is interrupted, the second device 1002 further stores topology information of the PCIe device, and a driver for the PCIe device is loaded to the second device, and when it is detected that the first device 1001 fails, the second device 1002 continues to process, according to the topology information, the driver, and the processing information, the transaction that is about the access of the host to the PCIe device and is being processed when the first device 1001 fails. Fast failover between a primary mCPU and a secondary mCPU can be implemented using the system, and reliability of a PCIe fabric is ensured.

Embodiment 6

Figure 11:
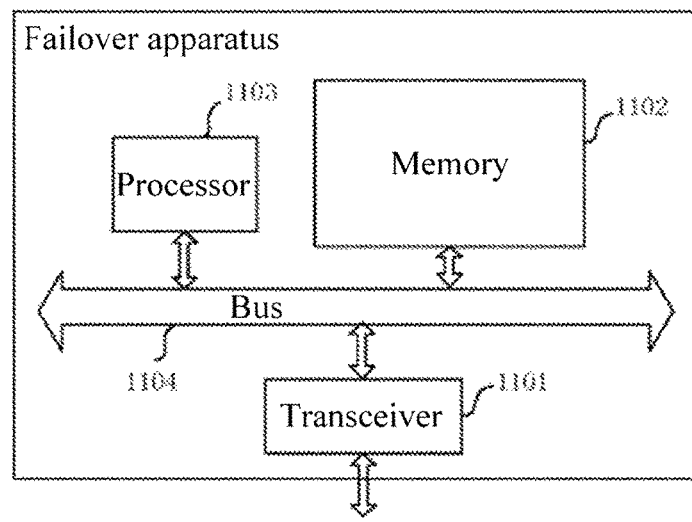
FIG. 11 is a schematic structural diagram of an entity of a failover apparatus according to an embodiment of the present disclosure.

FIG. 11 is a schematic structural diagram of an entity of a failover apparatus according to an embodiment of the present disclosure, which is used to implement the failover method according to the embodiments of the present disclosure, and for an operating principle of the apparatus, reference may be made to the foregoing method embodiments. As shown in FIG. 11, the failover apparatus may include a transceiver 1101, a memory 1102, a processor 1103, and a bus 1104. The processor 1103, the memory 1102, and the transceiver 1101 are connected and complete communication with each other using the bus 1104.

The transceiver 1101 is configured to receive a transaction processing packet used to notify the apparatus of a transaction that is about access of a host to a PCIe device and is processed by a first device, where the transaction processing packet carries processing information, and the processing information is used to describe information required for resuming the transaction when the transaction is interrupted.

The memory 1102 is configured to store topology information of the PCIe device and a loaded driver for the PCIe device.

The processor 1103 is configured to, when it is detected that the first device fails, continue to process, according to the processing information received by the transceiver 1101 and the topology information and the driver that are stored in the memory 1102, the transaction that is about the access of the host to the PCIe device and is being processed when the first device fails.

The transceiver 1101 is further configured to receive transaction content of the access of the host to the PCIe device, and transaction status data that is synchronized by the first device and is about the access of the host to the PCIe device, where the processing information includes the transaction content and the transaction status data.

The processor 1103 is further configured to determine, according to a transaction processing location identifier included in the transaction status data, a location in which the transaction is interrupted, and continue to process the interrupted transaction from the location in which the transaction is interrupted, or process the interrupted transaction again from a start position of the transaction.

The processor 1103 is further configured to delete, according to a transaction completion identifier included in the transaction status data, processing information corresponding to the transaction completion identifier after the transceiver receives the transaction processing packet.

The processor 1103 is further configured to find, according to the topology information, the PCIe device accessed by the host, access the PCIe device using the driver, and execute the transaction that is obtained according to the processing information and is being processed when the first device fails.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes any medium that can store program code, such as a read-only memory (ROM), a RAM, a magnetic disk, or an optical disc.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:
1. A failover method, comprising:
receiving, by a second device, a transaction processing location identifier associated with a transaction, the transaction being processed by a first device to access a peripheral component interconnect express (PCIe) device, and the transaction processing location identifier being used to resume the transaction when the transaction is interrupted by a failure of the first device;
determining, by the second device according to the transaction processing location identifier, a location at which the transaction is interrupted; and
continuing to process, by the second device, the interrupted transaction from the location at which the transaction is interrupted.

2. The method of claim 1, further comprising receiving, by the second device, transaction content of the access to the PCIe device.

3. The method of claim 2, wherein continuing to process the interrupted transaction comprises:
   finding, by the second device according to topology information, the PCIe device;
   accessing the PCIe device using a driver; and
   processing the interrupted transaction according to the transaction content.

4. The method of claim 1, wherein the transaction processing location identifier is a transaction completion identifier, and continuing to process the interrupted transaction comprises deleting, by the second device, information corresponding to the transaction completion identifier.

5. A system, comprising:
   a first device; and
   a second device in communication with the first device, the second device being configured to:
      receive a transaction processing location identifier associated with a transaction, the transaction being processed by a first device to access a peripheral component interconnect express (PCIe) device, and the transaction processing location identifier being used to resume the transaction when the transaction is interrupted by a failure of the first device;
      determine, according to the transaction processing location identifier, a location at which the transaction is interrupted; and
      continue to process the interrupted transaction from the location at which the transaction is interrupted.

6. The system of claim 5, wherein the second device is further configured to receive transaction content of the access to the PCIe device.

7. The system of claim 6, wherein the second device is configured to:
   find, according to topology information, the PCIe device;
   access the PCIe device using a driver; and
   process the interrupted transaction according to the transaction content.

8. The system of claim 5, wherein the transaction processing location identifier is a transaction completion identifier, and the second device is configured to delete information corresponding to the transaction completion identifier.

9. An apparatus, comprising:
   a processor; and
   a transceiver configured to receive a transaction processing location identifier associated with a transaction, the transaction being processed by a first device to access a peripheral component interconnect express (PCIe) device, and the transaction processing location identifier being used to resume the transaction when the transaction is interrupted by a failure of the first device, and
   wherein the processor is configured to:
      determine, according to the transaction processing location identifier, a location at which the transaction is interrupted; and
      continue to process the interrupted transaction from the location at which the transaction is interrupted.

10. The apparatus of claim 9, wherein the transceiver is further configured to receive transaction content of the access to the PCIe device.

11. The apparatus of claim 10, wherein the apparatus further comprises:
   a memory coupled to the processor and configured to store topology information of the PCIe device; and
   a driver for the PCIe device coupled to the processor, and wherein the processor is configured to:
      find, according to the topology information, the PCIe device;
      access the PCIe device using the driver; and
      process the interrupted transaction according to the transaction content.

12. The apparatus of claim 9, wherein the transaction processing location identifier is a transaction completion identifier, and the processor is configured to delete information corresponding to the transaction completion identifier.

* * * * *